(12) United States Patent
Farral et al.

(10) Patent No.: US 6,505,326 B1
(45) Date of Patent: Jan. 7, 2003

(54) ANALYZING THERMAL CHARACTERISTICS OF GEOMETRIES

(75) Inventors: Christopher J. Farral, Greenville, SC (US); Linda Farral, Greenville, SC (US); David M. Johnson, Simpsonville, SC (US); Mullahalli V. Srinivas, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 88 days.

(21) Appl. No.: 09/676,439

(22) Filed: Sep. 29, 2000

(51) Int. Cl.⁷ .................. G06F 17/50; G06F 17/10; F28F 7/00; G06T 15/30; G09G 5/00; B64C 11/34
(52) U.S. Cl. .................. 716/5; 716/1; 716/3; 716/10; 716/19; 716/20; 703/2; 165/185; 345/423; 345/619; 244/17.13
(58) Field of Search ...................................... 716/1–21

(56) References Cited

U.S. PATENT DOCUMENTS

| | | | |
|---|---|---|---|
| 4,797,842 A | | 1/1989 | Nackman et al. |
| 4,829,441 A | * | 5/1989 | Mandle et al. .......... 244/17.13 |
| 4,912,664 A | * | 3/1990 | Weiss et al. .................. 716/20 |
| 4,933,889 A | * | 6/1990 | Meshkat et al. ............ 345/423 |
| 5,010,501 A | * | 4/1991 | Arakawa .................... 345/619 |
| 5,550,750 A | * | 8/1996 | Wolff ......................... 345/423 |
| 5,553,009 A | * | 9/1996 | Meshkat et al. .............. 716/20 |
| 5,581,489 A | | 12/1996 | Groothuis et al. |
| 5,675,521 A | * | 10/1997 | Holzhauer et al. ............ 716/19 |
| 5,768,156 A | * | 6/1998 | Tautges et al. ............... 716/10 |
| 5,926,399 A | | 7/1999 | Berkooz et al. |
| 5,936,869 A | | 8/1999 | Sakaguchi et al. |
| 5,940,309 A | | 8/1999 | White |
| 5,946,479 A | | 8/1999 | Sakaguchi et al. |
| 6,064,806 A | * | 5/2000 | Lakos et al. .................... 716/3 |
| 6,096,088 A | | 8/2000 | Yu et al. |
| 6,259,453 B1 | * | 7/2001 | Itoh et al. ...................... 716/20 |
| 6,266,062 B1 | * | 7/2001 | Rivara ......................... 165/185 |
| 6,317,704 B1 | | 11/2001 | Furuhata et al. |
| 6,356,860 B1 | | 3/2002 | Barnette |
| 6,360,190 B1 | * | 3/2002 | Kumashiro ..................... 703/2 |
| 6,389,582 B1 | * | 5/2002 | Valainis et al. ................. 716/1 |
| 2002/0026627 A1 | * | 2/2002 | Cobb ............................ 716/19 |
| 2002/0040465 A1 | * | 4/2002 | Kimura et al. .................. 716/5 |
| 2002/0073380 A1 | * | 6/2002 | Cooke et al. .................... 716/1 |

OTHER PUBLICATIONS

PTC, Pro/Mechanica Thermal, Geometry Creation, Thermal Simulation http://www.ptc.com/products/proe/sim/thermal.htm, (Jul. 2002).

(List continued on next page.)

Primary Examiner—Vuthe Siek
Assistant Examiner—Andrea Liu
(74) Attorney, Agent, or Firm—Perkins Coie LLP

(57) ABSTRACT

A system and method for analyzing a baseline geometry and, optionally, a modified geometry. The method can include generating a numerical representation of a baseline geometry having baseline elements identified with first identifiers or element identifiers, and then assigning second identifiers or analyzer identifiers to the elements. Thermal characteristics of the geometry are analyzed with reference to the second or analyzer identifiers. The results of the thermal analysis can be provided as an input for a structural analysis of the baseline geometry. At least one of the elements of the geometry can then be altered in a manner that at least partially automatically adjusts the surrounding geometry, and the same first identifier or element identifier is associated with the altered element as was associated with the baseline, unaltered element. The altered geometry can be analyzed with respect to a third identifier (or another analyzer identifier) and a correspondence between the identifiers, the baseline element, and the altered element can be established and maintained. Accordingly, the boundary conditions and/or the mesh applied to the baseline geometry can be automatically applied to the altered geometry by referring to the first or element identifiers. Therefore, the time and effort required to analyze the altered geometry can be reduced when compared to the effort typically required by conventional methods.

19 Claims, 13 Drawing Sheets

OTHER PUBLICATIONS

EDS, Products—Teamcenter Engineering http://www.eds.com/products/plm/teamcenter/engineering/, (Jul. 2002).

ANSYS Incorporated, ANSYS/Mechanical http://www.ansys.com/ansys/mechanical.htm, (Jul. 2000).

ANSYS Incorporated, Automatic Geometry Healing Module http://www.ansys.com/ansys/geometry_processing.htm, (Jul. 2992).

MSC.Patran Data Sheet, Thermal http://www.mscsoftware.com/assets/287_PA_LT–DAT–THM.pdf, (Jul. 2002).

MSC Software, Mechanical Solutions, Patran Version 8.0 http://www.mechsolutions, Patran Version 8.0http://www.mechsolutions.com/products/patran/pat_v8.html, (Sep. 2000).

Unigraphics–MSC.Patran Interoperability.

* cited by examiner

ANALYZING THERMAL CHARACTERISTICS OF GEOMETRIES

TECHNICAL FIELD

The following disclosure relates generally to numerical systems and methods for analyzing thermal characteristics of geometries.

BACKGROUND

Computer-based numerical methods are typically used to analyze properties of complex geometries. For example, commercially available computer analysis codes available from ANSYS, Inc. of Cannonsburg, Pa. or other vendors, are used to model the structural and/or thermal properties of power generation components, including compressors and turbines. These computer codes can be used to analyze a variety of different component configurations and can accordingly assist designers and engineers in improving and/or optimizing the design of the components.

The equations governing the structural and thermal characteristics of complex geometries are themselves complex, and typically include second order partial differential equations. One common technique for solving such equations is to break the geometry up into small units by applying a mesh to the geometry. The technique further includes establishing boundary conditions (such as material properties and applied forces) for selected mesh units of the component geometry. The governing equations are then applied to each mesh unit and are solved in an iterative fashion to generate a solution for the entire geometry.

When the analysis code is used as a design tool, the component geometry (which is input to the analysis code) is typically generated using a computer-aided design (CAD) program, such as a program allow users to easily visualize and manipulate the geometry, for example, on a computer display screen. A numerical definition of the geometry is then transferred from the CAD program to the analysis code for generating a solution in the manner described above. One problem with this approach is that applying the mesh and boundary conditions to a complex geometry is typically a difficult and time-consuming task For example, users must typically manually and interactively select elements from a screen display of the geometry and specify the boundary conditions and mesh to be applied to each element. Accordingly, it can be cumbersome to use the analysis code as a design tool because the mesh and boundary conditions must be manually regenerated and reapplied each time the geometry is changed with the CAD program. One approach to addressing this problem is to provide the analysis code with the capability to change the geometry. However, conventional analysis codes are not configured to make such geometry changes simply or in an easily visualized manner (unlike conventional CAD programs). Furthermore, the analysis capability of some conventional analysis codes is compromised when the code is modified to include geometry generation/change capabilities. Accordingly, it may still be difficult for the designer to use the analysis code in an effective manner.

Figure 1:
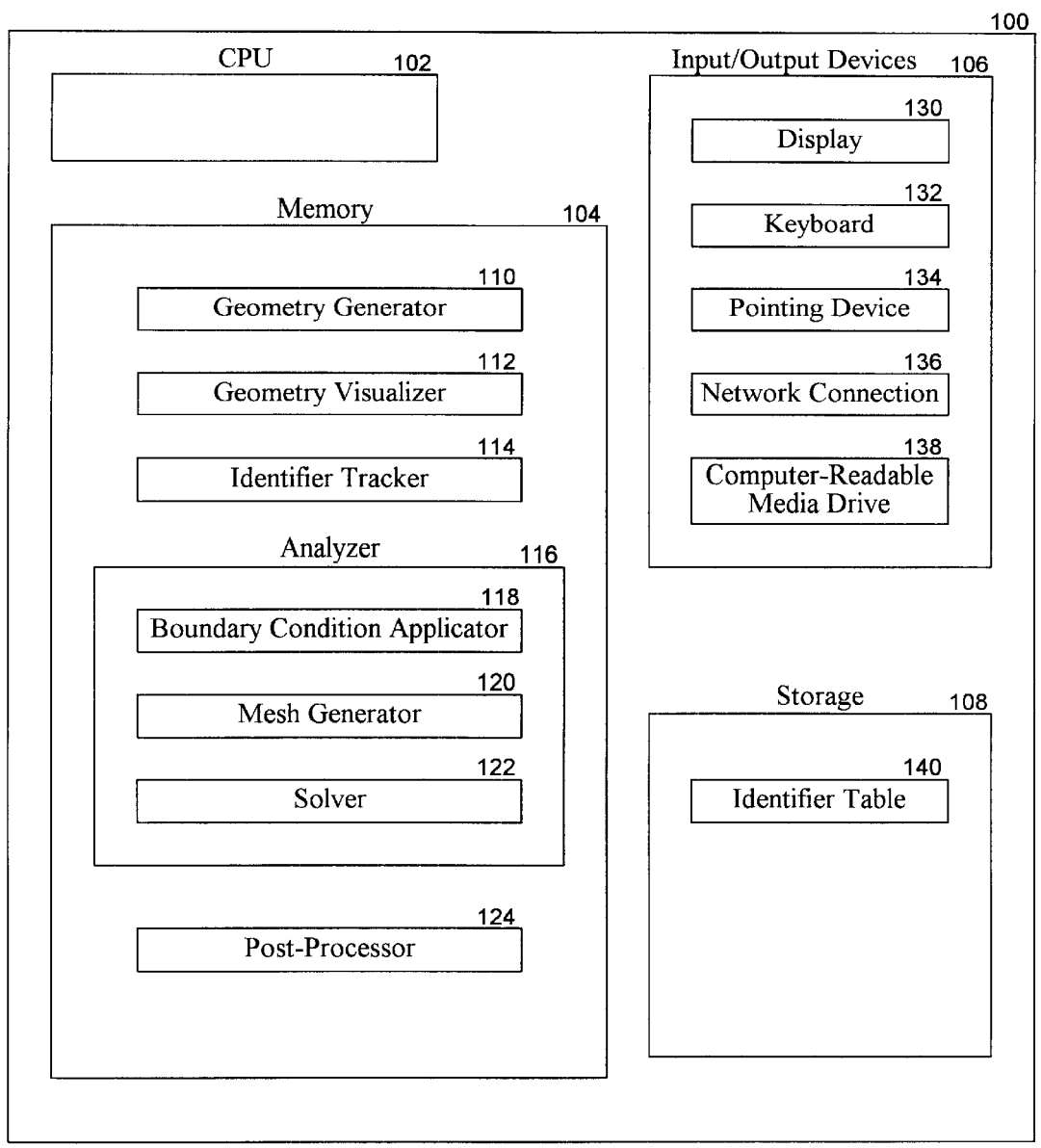
FIG. 1 is a block diagram illustrating a suitable system in which aspects of the invention may operate.

In the drawings, identical reference numbers identify identical or substantially similar elements or steps. To readily identify the discussion of any particular element or step, the most significant digit or digits in a reference number refer to the figure number in which that element is first introduced (e.g., element 308 is introduced and discussed in FIG. 3).

DETAILED DESCRIPTION

A system and method for analyzing a baseline and, optionally, a modified geometry is provided. In one embodiment, the method receives a representation of the geometry along with an associated element identifier for each geometric element from a CAD model. The method then receives a mapping between the element identifiers and analyzer identifiers from an analyzer. Then for commands to be applied to the geometric element by using the analyzer, the method uses the element identifier to automatically determine the analyzer identifier analyzer identifier are then executed by the analyzer. The commands can include, for example, assigning a mesh or boundary condition to each element. A selected characteristic of the geometry (such as structural stresses or thermal gradients) can then be analyzed with reference to the assigned meshes and boundary conditions.

In one aspect of this embodiment, the analyzer identifier is a baseline analyzer identifier and the method can further include receiving a representation of an altered version of the geometry having an element replaced by an altered element identified by the same element identifier, and generating a command that identifies the altered element by a determined altered analyzer identifier.

In another embodiment, the method includes generating a numerical representation of a baseline geometry, tagging elements of the baseline geometry with first identifiers (that serve generally the same function as the element identifiers), and then assigning to the elements second identifiers (that serve generally the same function as the analyzer identifiers). A selected characteristic of the geometry (for example, thermal loading or structural loading) is analyzed with reference to the second identifiers. At least one of the elements of the geometry can then be altered in an at least partially automated, parametric fashion and the same first identifier can be applied to the altered element as was applied to the baseline, unaltered element. The altered geometry can be analyzed with respect to a third identifier (that serves the same function as the altered analyzer identifier) and correspondence between the identifiers, the baseline element, and the altered element can be established and maintained. Accordingly, the boundary conditions and/ or the mesh applied to the baseline geometry can be automatically applied to the altered geometry by referring to the first identifiers. Therefore, the time and effort required to analyze the altered geometry can be reduced when compared to the effort typically required by conventional methods.

The following description provides specific details for a thorough understanding of, and enabling description for, embodiments of the invention. However, one skilled in the relevant art will understand that the invention may be practiced without these details. In other instances, well-known structures and functions have not been shown or described in detail to avoid unnecessarily obscuring the description of the embodiments of the invention.

FIG. 1 and the following discussion provide a brief, general description of a suitable computing environment in which aspects of the invention may be implemented. FIGS. 2A–2C, 4, 9, and 10 provide further details of methods that can be carried out in full or in part by a computer in accordance with an embodiment of the invention. The remaining figures illustrate sample geometries and solutions obtained as a result of carrying out methods in accordance with embodiments of the invention.

Although not required, embodiments of the invention will be described in the general context of computer-executable instructions, such as routines executed by a general-purpose computer (e.g., a mainframe computer or personal computer). Those skilled in the relevant art will appreciate that the invention can be practiced with other computer system configurations, including internet appliances, hand-held devices (including palm-top computers, wearable computers, cellular or mobile phones, multi-processor systems, microprocessor-based or programmable consumer electronics, set-top boxes (such as for use with television sets), network PCs, mini-computers, mainframe computers and the like. The invention can be embodied in a special-purpose computer or data processor that is specifically programmed, configured or constructed to perform one or more of the computer-executable instructions explained in detail below. Indeed, the term "computer" as generally used herein, refers to any of the above devices as well as any data processor.

The invention can also be practiced in distributed computing environments, where tasks or modules are performed by remote processing devices, which are linked through a communications network. In a distributed computing environment, program modules or sub-routines may be located in both local and remote memory storage devices. Aspects of the invention described below may be stored or distributed on computer-readable media, including magnetic and optically readable and removable computer disks as well as distributed electronically over the Internet or over other networks (including wireless networks).

FIG. 1 is a schematic block diagram illustrating components of a computer 100 in accordance with an embodiment of the invention. In one aspect of this embodiment, the computer 100 can include a CPU 102, a memory 104, input/output devices 106, and a storage device 108. The memory 104 can include a geometry generator 110 for creating numerical representations of selected geometries, and a geometry visualizer 112 for visualizing the geometries. The memory 104 can further include an identifier tracer 114 that tracks identifiers tagged to elements of the geometry. An analyzer 116 analyzes the geometry and includes a boundary condition applicator 118 for applying boundary conditions to the geometry, a mesh generator 120 for dividing the geometry into mesh units, and a solver 122 for solving the equations governing the behavior of the geometry. The memory can still further include a post-processor 124 for processing the solutions generated by the solver 122.

The input/output devices 106 can include a display 130, such as a graphic user interface (GUI) for displaying the geometry and/or solution generated by the analyzer 116. The input/output devices 106 can further include a keyboard 132, a pointing device 134, a network connection 136, and a computer-readable media drive 138. Accordingly, the computer 100 can read computer-readable media having software for the geometry generator 110, the geometry visualizer 112, the identifier tracker 114, the analyzer 116, and/or the post-processor 124. The software can also be accessible from the memory 104, as described above.

The storage device 108 can include file storage for such features as an identifier table 140 that includes a correlation between identifiers and elements of the geometry generated by the geometry generated 110. The storage device 108 can also store other files, such as the numerical representation of the geometry and the solution produced by the analyzer 116.

To illustrate the processing of each component or routine of the embodiments described herein, each component is described as a single routine, process or method implemented (at least in part) on one or more computers, such as the computer 100. One skilled in the relevant art will appreciate that each of these components may be implemented as individual steps performed by one or more separate routines or sub-routines. Alternatively, the functions performed by individual routines or sub-routines may be combined and performed by a fewer number of routines or sub-routines.

Figure 2A:
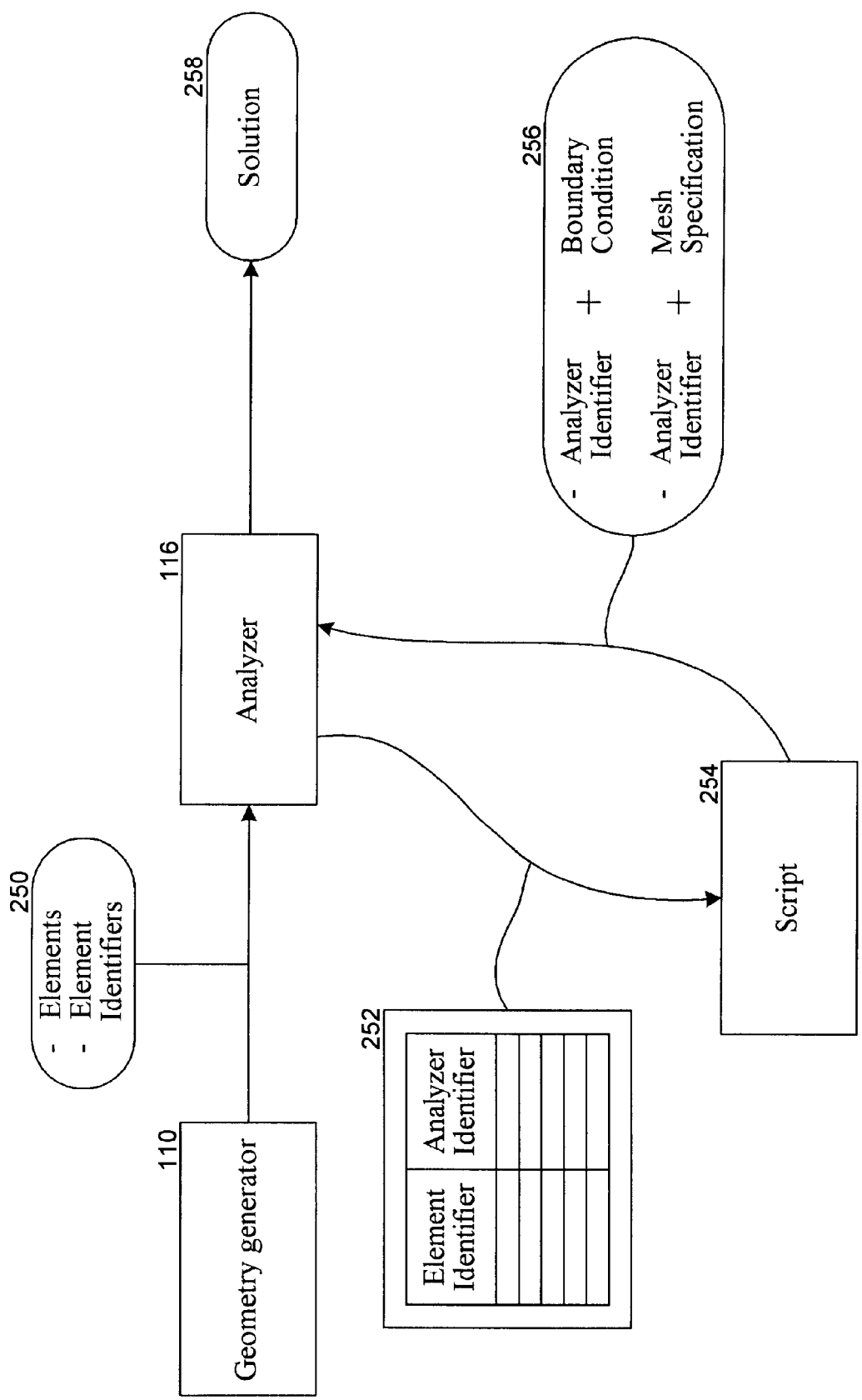
FIG. 2A is a flow diagram illustrating the operation of several elements shown in FIG. 1 in accordance with an embodiment of the invention.

FIG. 2A is a flow diagram illustrating the operation of several of the elements described above with reference to FIG. 1, in accordance with an embodiment of the invention. In one aspect of this embodiment, the geometry generator 110 generates a numerical representation of a geometry. The output 250 from the geometry generator 110 can include a plurality of geometric elements that together define the geometry. Each geometric element can be identified by one or more element identifiers. For example, when one of the elements includes a four-sided shape, the element identifiers can include a unique identifier for each side of the element and an additional identifier corresponding to an area of the element. The element identifiers can be automatically generated by the geometry generator 110 and can have any format that is compatible with the entities performing the subsequent steps described below.

The analyzer 116 inputs the output 250 from the geometry generator 110 and assigns an analyzer identifier to each element identifier. One output 252 of the analyzer 116 can include a table linking each element identifier with the corresponding analyzer identifier. In one aspect of this embodiment, the table can be generally similar to a table output by conventional geometry generation codes, and can have the element identifiers and corresponding analyzer identifiers distributed randomly in the table. The output 252 from the analyzer 116 is used by a script 254 that establishes boundary conditions and mesh specifications 256 for each analyzer identifier by executing commands of the analyzer. The script uses the element identifier to determine the corresponding analyzer identifier and then directs the execution of the commands using the analyzer identifier. The analyzer 116 executes the commands to apply the boundary conditions and mesh specifications to the geometry using the analyzer identifiers, and outputs a solution 258.

In one aspect of this embodiment, the geometry generator 110 can be used to modify the geometry and replace at least one of the elements with an altered element that is identified by the same element identifier as the element it replaces. The analyzer 116 can generated altered analyzer identifiers for each element identifier. The altered analyzer identifiers can be arbitrarily assigned to the altered element and accordingly may or may not be the same as the analyzer identifier associated with the corresponding unaltered element. The altered analyzer identifiers are received by the script 254, which can automatically apply the same boundary conditions and mesh specifications to the altered elements as were applied to the baseline elements by referring to the correspondence between the element identifier and the altered analyzer identifier. The analyzer 116 then generates a new solution corresponding to the altered geometry.

Figure 2B:
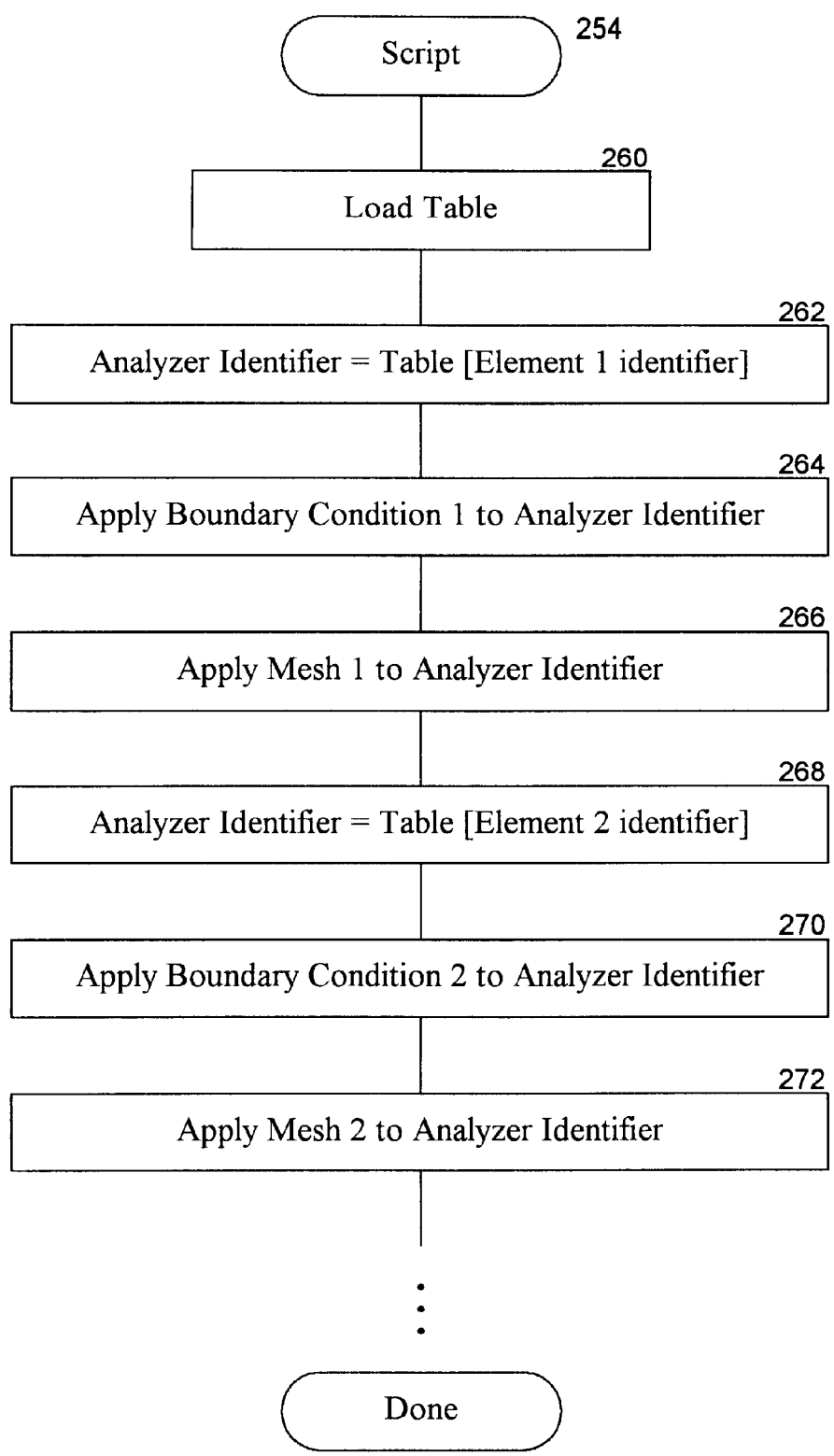
FIG. 2B is a flow diagram illustrating the operation of a script shown in FIG. 2A in accordance with an embodiment of the invention.

FIG. 2B is a flow diagram illustrating the operation of the script 254 in accordance with one embodiment of the invention. In one aspect of this embodiment, the script 254 can be external to the analyzer 116. Alternatively, the script 254 can be made internal to the analyzer 116 or another of the modules described above. In either embodiment, the script 254 loads the table (shown as output 252 in FIG. 2A) produced by the analyzer 116 (step 260). The script 254 selects the analyzer identifier corresponding to a first element identifier in step 262. In step 264, the script 254 applies the boundary condition corresponding to the first element identifier to the analyzer identifier, and in step 266, and the script 254 applies the mesh corresponding to the first element identifier t the analyzer identifier. In steps 268–272, the script repeats steps 262–266 for a second element identifier. These foregoing steps are then repeated until all the relevant element identifiers have a boundary condition and mesh applied thereto. The geometry can then be analyzed and, optionally, altered and re-analyzed, as is described in greater detail below in the context of another embodiment.

Figure 2C:
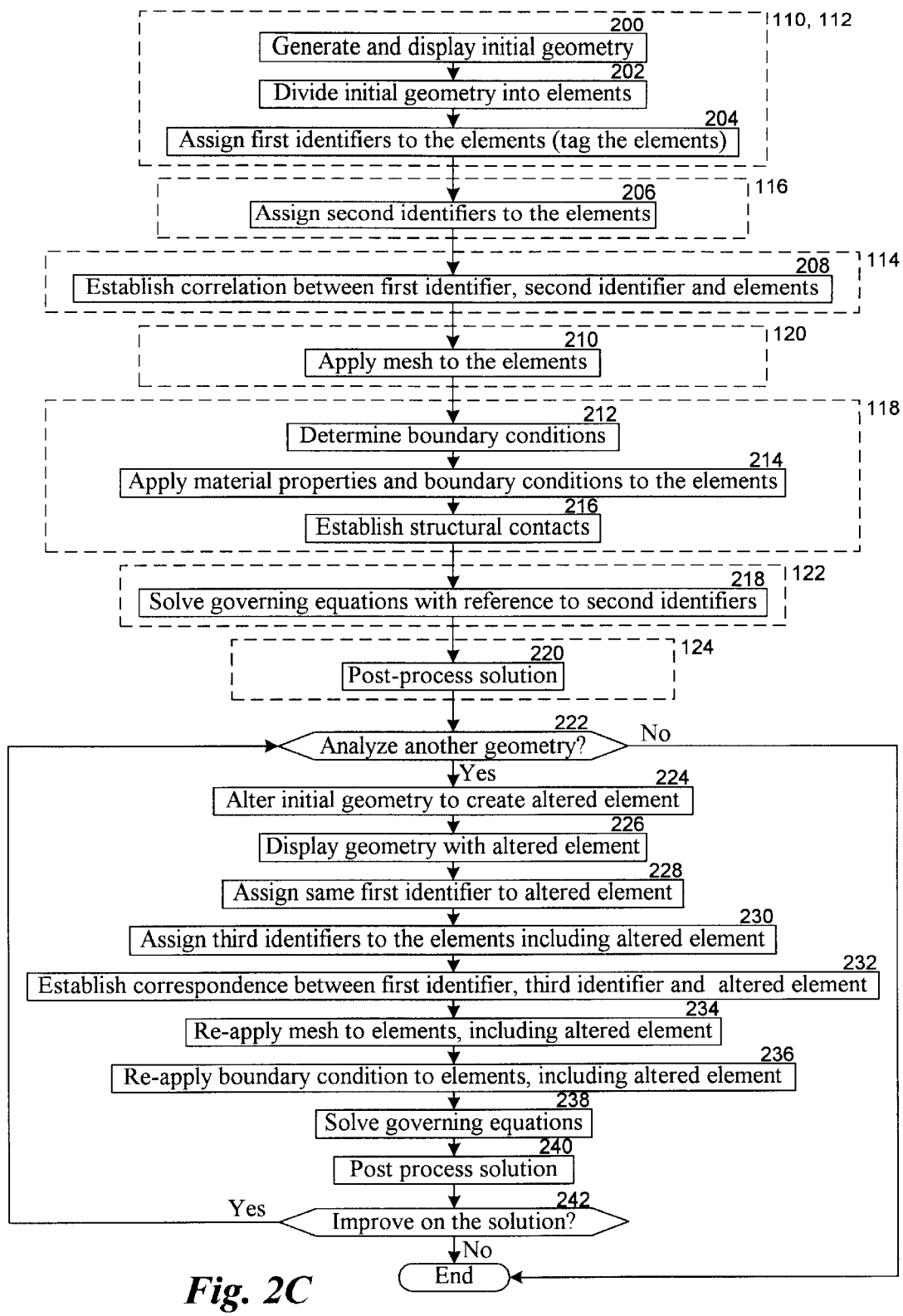
FIG. 2C is a flow diagram illustrating a method for analyzing geometries in accordance with an embodiment of the invention.

FIG. 2C includes a flow diagram illustrating a method for analyzing a baseline geometry and an altered geometry in accordance with another embodiment of the invention. In this embodiment, steps 208–214 replace the steps described above with reference to FIGS. 2A and 2B. Alternatively, the steps described above with reference to FIGS. 2A–2B can be substituted for steps 208–214. Beginning with step 200, the geometry generator 110 and the geometry visualizer 112 can generate and display, respectively, a baseline geometry. These steps can be performed by a commercially available CAD tool, such as a Unigraphics CAD package, available from Unigraphics Solutions, Inc. of Maryland Heights, MO. Alternatively, these steps can be performed by other CAD packages, such as CATIA, available from IBM of New York, N.Y. In either embodiment, the baseline geometry can be displayed on the GUI to aid the user in visualizing the geometry. The visual display can also include dimensions of one or more components of the geometry to further increase the utility of the display.

In step 202, the geometry is divided or "chunked" into smaller elements. The manner in which the geometry is divided into elements can be based on any number of user-defined criteria. For example, each element can correspond to a separable component of the geometry (such as a bolt) or portion of a component of the geometry (such as a bolt head). Alternatively, the elements can be selected based on where the user expects to concentrate a mesh for the geometry, as will be described in greater detail below with reference to FIG. 5. In either embodiment, the entire geometry can be portable as a unit, for example, for transmission between the geometry generator 110 and the analyzer 116. Alternatively, separable portions of the geometry can be individually portable so that when one portion is changed, only that portion and not the entire geometry need be transmitted to the analyzer 116.

Figure 3:
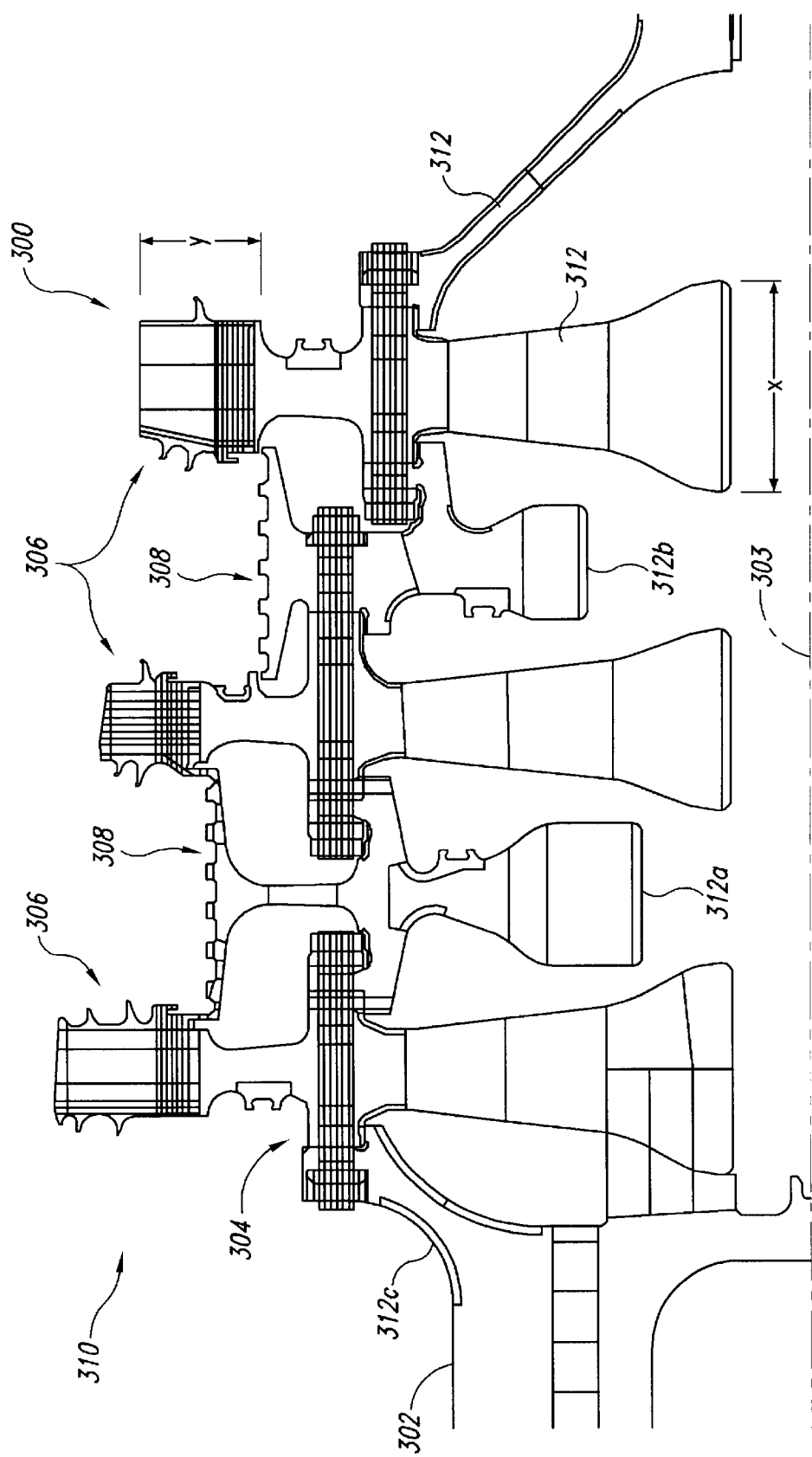
FIG. 3 is a cross-sectional side view of a portion of a turbine geometry divided into elements for analysis in accordance with an embodiment of the invention.

In one embodiment, the geometry can include a portion of an axial flow turbine used for power generation. For example, as shown in FIG. 3, the geometry can include a generally axisymmetric multi-stage turbine section 300 that includes a shaft 302 having a shaft centerline 303 and plurality of turbine wheels 304 supporting turbine blades 306 an separated by spacers 308. Flow passes through the turbine section 300 from left to right as indicated by arrow 310 to turn the shaft 302. Dimensions "x" and "y" are shown schematically in FIG. 3. The turbine geometry is divided into a plurality of elements 312, including baseline elements 312a–312c, which are altered in a subsequent design described below with reference to FIG. 6.

In other embodiments, the geometry generated and displayed in step 200 can include numerical representations of other configurations. For example, the geometry can include a compressor section of a piece of power generation equipment, as will be discussed in greater detail below with reference to FIGS. 11 and 12. In still further embodiments, the geometry can include other configurations. In any of these embodiments, the configurations can be represented in a numerical fashion that can be accessed, manipulated and/or displayed by a computer, such as the computer 100 described above.

Returning now to FIG. 2C, first identifiers or tags are assigned to the geometry elements in step 204. In one aspect of this embodiment, the first identifiers can be assigned by the geometry generator 110. Alternatively, the first identifiers can be assigned by a separate routine or sub-routine. In either embodiment, second identifiers are assigned to the elements in step 206. The second identifiers are generally used by the analyzer 116 for analyzing the geometry. Accordingly, in one aspect of this embodiment, the second identifiers are assigned by the analyzer 116. Alternatively, the second identifiers can be assigned by a separate routine or subroutine. In either embodiment, the first identifier serves generally the same function as the element identifier described above with reference to FIGS. 2A–2B and the second identifier serves generally the same function as the analyzer identifier described above with reference to FIGS. 2A–2B.

Figure 4:
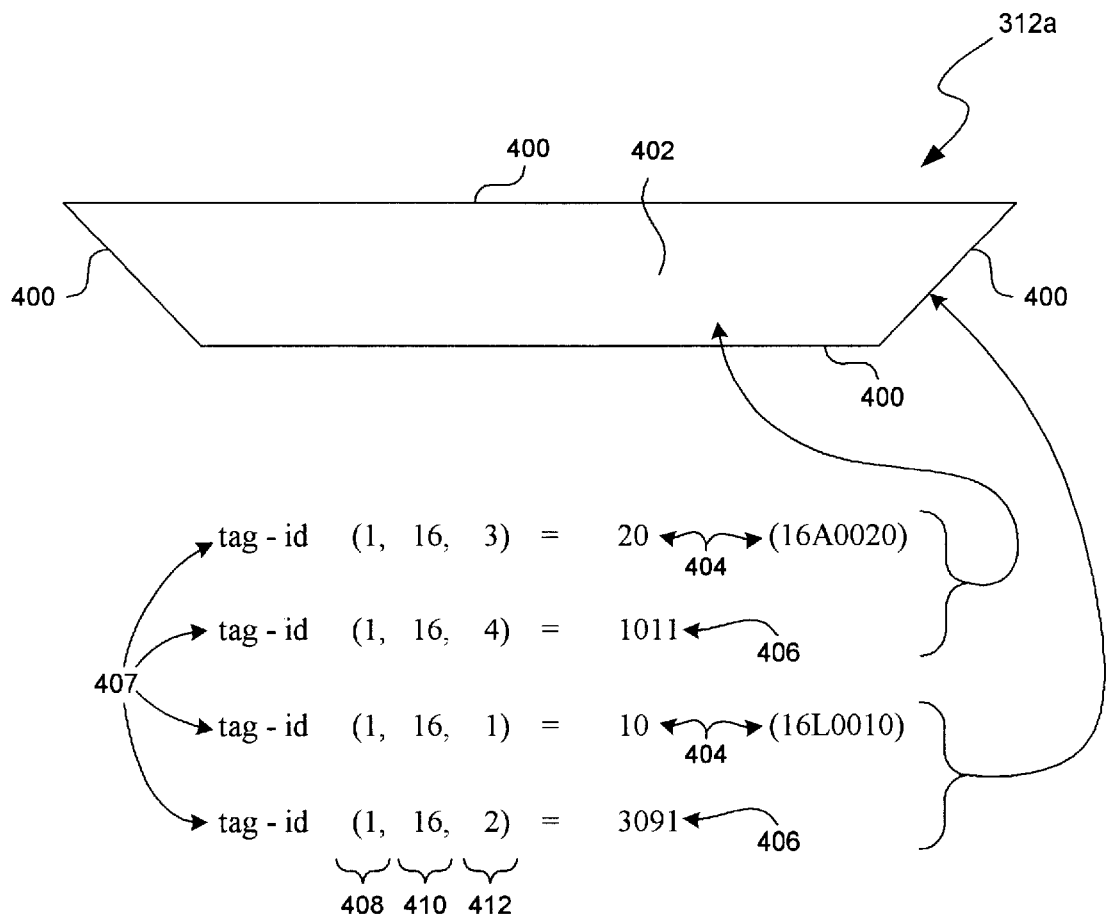
FIG. 4 is an illustration of one element shown in FIG. 3 along with computer statements for assigning identifiers to portions of the element in accordance with an embodiment of the invention.

In step 208, a correlation is established between the first identifiers, the second identifiers and the elements to which they have been assigned. The correlation can be established by the analyzer 116 or by a routine external to the analyzer 116. In either embodiment, the correlation can be established and maintained via a multi-dimensional table. For example, as shown in FIG. 4, the element 312a can include a plurality of edges 400 and a face 402. A first identifier 404 and a second identifier 406 can be assigned to the face 402 and each edge 400. The correlation between the first identifier 404, the second identifier 406 and the face 402 (or edge 400) can be established by assigning the first identifier 404 and the second identifier 406 to a three-dimensional table. For example, the first identifier 404 and the second identifier 406 can each be assigned to a position in a three-dimensional table with assignment statements 407 where the first dimension 408 corresponds to a counter number, the second dimension 410 corresponds to an element number (e.g., element number 16 refers to element 312a), and the third dimension 412 indicates whether the identifier corresponds to a face or an edge and whether the identifier is a first identifier or a second identifier. In a further aspect of this embodiment, the third dimension 412 has a value of one when the identifier is a first identifier of an edge, two when the identifier is a second identifier of an edge, three when the identifier is a first identifier of a face, and four when the identifier is a second identifier of a face. The first identifier 404 and can also be referred to by the parenthetical designation shown in FIG. 4 (e.g., 16A0020 for an area or face and 16L0010 for a line or edge). In other embodiments, the correlation between the elements 312a of the geometry and the first and second identifiers 404, 406 can be established and maintained in other manners, for example, with other structured databases or matrices. In either of these embodiments, the locations of the first and second identifiers within the database can be arranged in a structured, organized fashion, which can facilitate finding the identifiers in the database during subsequent operations.

Figure 5:
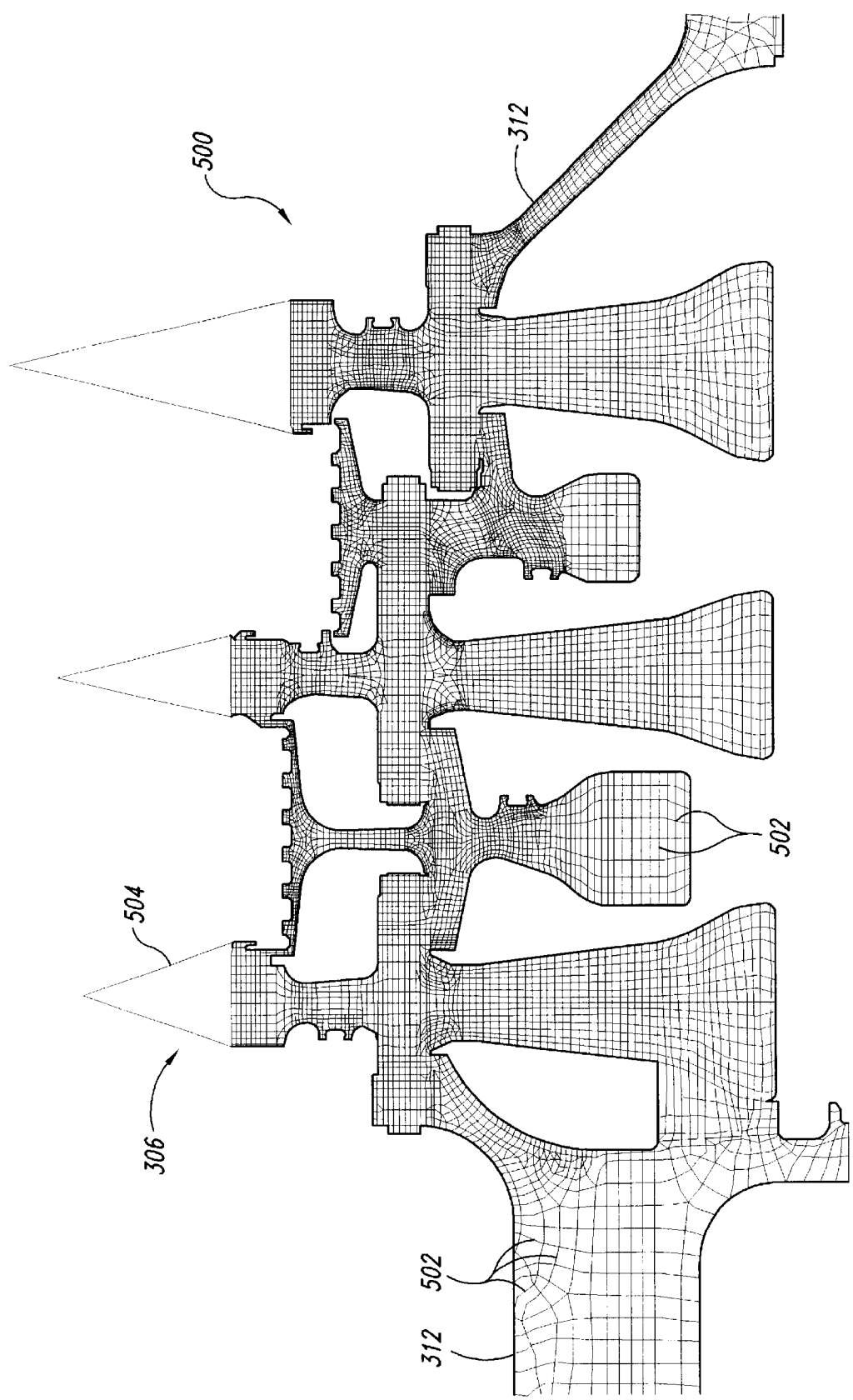
FIG. 5 is a cross-sectional side view of the geometry shown in FIG. 3.

Returning now to FIG. 2C, a mesh or grid is applied to each of the elements 312 using the mesh generator 120. A typical mesh 500 is shown in FIG. 5, which illustrates a network of mesh lines 502 arranged to divide each element 312 into a plurality of mesh units. In one aspect of this embodiment, the turbine blades 306 are simulated by a blade simulation mesh 504 to simplify the structural analysis of the turbine geometry. The number of mesh lines 502 per element 312 and the manner or rule by which neighboring mesh lines 502 are spaced apart from each other can be controlled by the user. Alternatively, the mesh generator 120 can apply the mesh lines 502 according to a default rule.

In step 212, the boundary conditions to be applied to the geometry are determined, and in step 214, the boundary conditions are applied to the elements 312 of the geometry by the boundary condition applicator 118. In one embodiment, (for example, when the analyzer 116 is configured to solve the structural equations governing the structural behavior of the geometry), the boundary conditions can include pressures, forces, displacements, and temperatures initially applied to one or more of the geometric elements 312. In a further aspect of this embodiment, the temperature boundary conditions can be calculated for the structural analysis using a process generally similar to that shown in steps 200–220 of FIG. 2C. Accordingly, many of these steps can be initially performed with a thermal analysis code to establish temperature boundary conditions which are then input to the structural analysis at step 214. Further details of the interaction between thermal and structural analysis will be discussed below with reference to FIGS. 11 and 12.

When the analysis completed with the method shown in FIG. 2C includes a structural analysis, structural contacts are established in step 216. The structural contacts correspond to specific boundary conditions indicating the nature of the contact (e.g., sliding, fixed, etc.) between adjacent elements 312 of the geometry.

In step 218, the solver 122 receives a numerical definition of the geometry and solves equations governing the selected characteristic of the geometry with reference to the second identifiers. For example, when the selected characteristic includes structural loading of the components of the geometry, the solver 122 solves force and moment equations and does so with reference to the second identifiers 406. Accordingly, the solution results are output by the solver 122 with reference to the second identifiers 406. In one embodiment, the solution can be a steady state solution and in another embodiment, the solution can be a transient solution.

In step 220, the solution is post-processed. When the analysis completed is a structural analysis, the post-processing can include generating a contour plot of the stress levels for various components of the geometry, as will be discussed below with reference to FIG. 8. In a further aspect of this embodiment, the step of post processing the solution can be completed with reference to the first identifiers 404 using the correlation established in step 208. Accordingly, the solution results can be displayed in a manner that is compatible with the geometry generated and displayed in step 200.

In step 222, a determination is made as to whether to alter the geometry and analyze the altered geometry. If the determination is made to alter the geometry, the geometry is altered in step 224 to create an altered version of the geometry having at least one altered element. The geometry, including altered element, is displayed in step 226. In step 228, the same first identifier that was initially assigned to the baseline element in step 204 is now assigned to the altered element. In step 230, third identifiers are assigned to the elements of the altered geometry, including the altered element. The third identifier can be the same as or different than the second identifier. In either embodiment, the third identifier serves generally the same function as the altered analyzer identifier applied to the altered geometry and described above with reference to FIGS. 2A–2B. In step 232, a correlation is established between the first identifier, the third identifier and the altered element, for example, using a multi-dimensional table as was described above with reference to FIG. 4. In step 234, the mesh is re-applied to the geometric elements, including the altered element, and in step 236, the boundary conditions are re-applied to the elements, including the altered element. The governing equations are solved in step 238 and the solution is post-processed in step 240. In step 242, the decision is made whether to continue to alter and analyze the geometry. Accordingly, the foregoing steps can be executed iteratively until a desired solution results.

Figure 6:
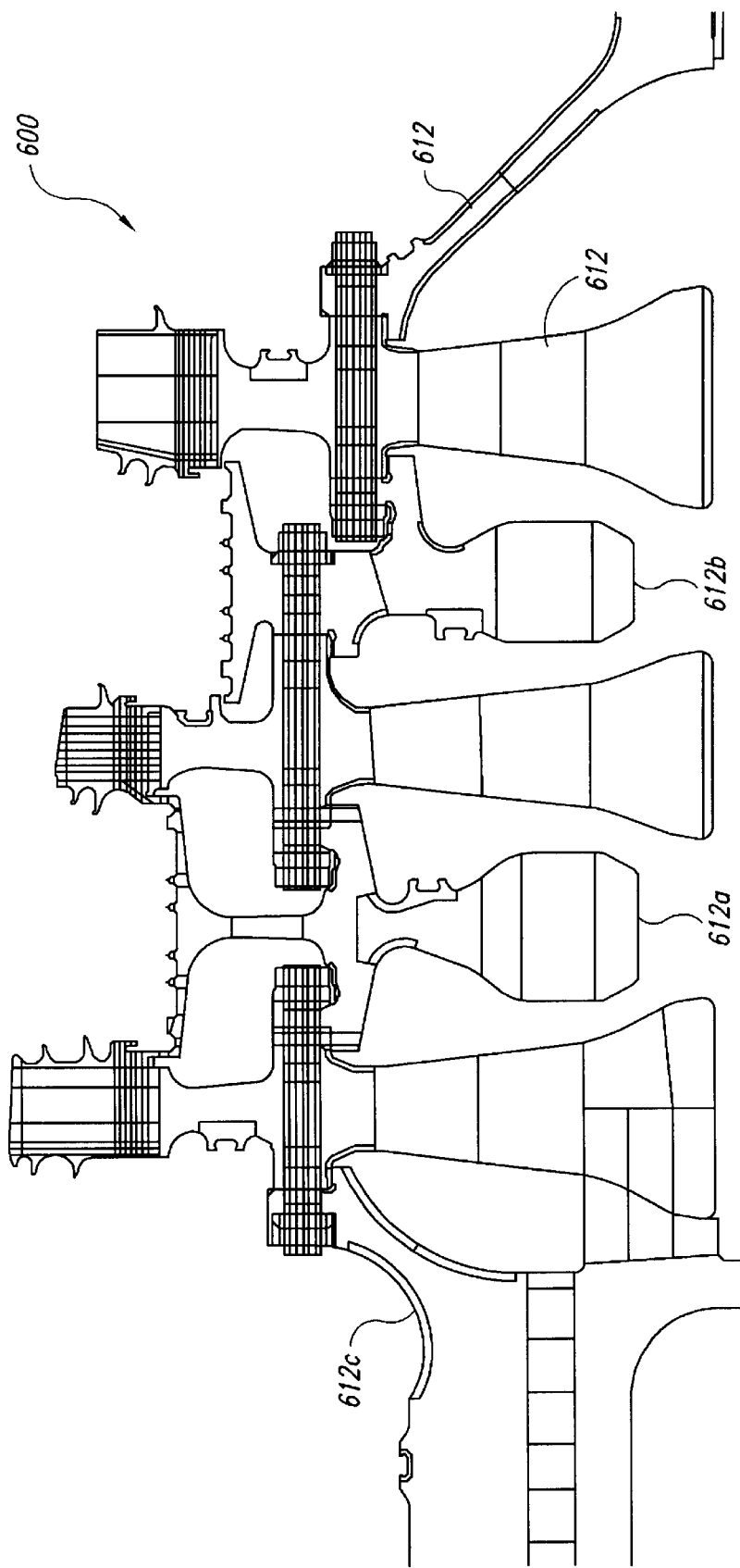
FIG. 6 is a cross-sectional side view of a portion of an altered turbine geometry in accordance with an embodiment of the invention.

FIG. 6 illustrates an altered geometry 600 corresponding generally to the geometry 300 described above with reference to FIG. 3, but having altered elements 612a—612c in place of elements 312a–312c respectively. In one aspect of this embodiment, the user can request a change to one portion of the altered elements 612a and 612b and the geometry generator 110 and geometry visualizer 112 can automatically adjust and displayed other aspects of the altered elements in a parametric fashion to maintain consistency and compatibility with the rest of the geometry. For example, the user can specify that the lower edges of elements 612a–612c be moved downwardly and shortened, and the left and right edges of these elements can be automatically lengthened to accommodate this change.

Furthermore, the geometry generator 110 and geometry visualizer 112 can automatically adjust and display the size and shape of neighboring elements to accommodate the changes to the shape of the altered elements. For example, the user can input a change to the arc length of radial element 612C and the surrounding elements can be automatically adjusted to maintain connectivity with the altered element. Accordingly, the user can make and visualize parametric changes to one area of the geometry without having to manually regenerate the entire geometry.

Figure 7:
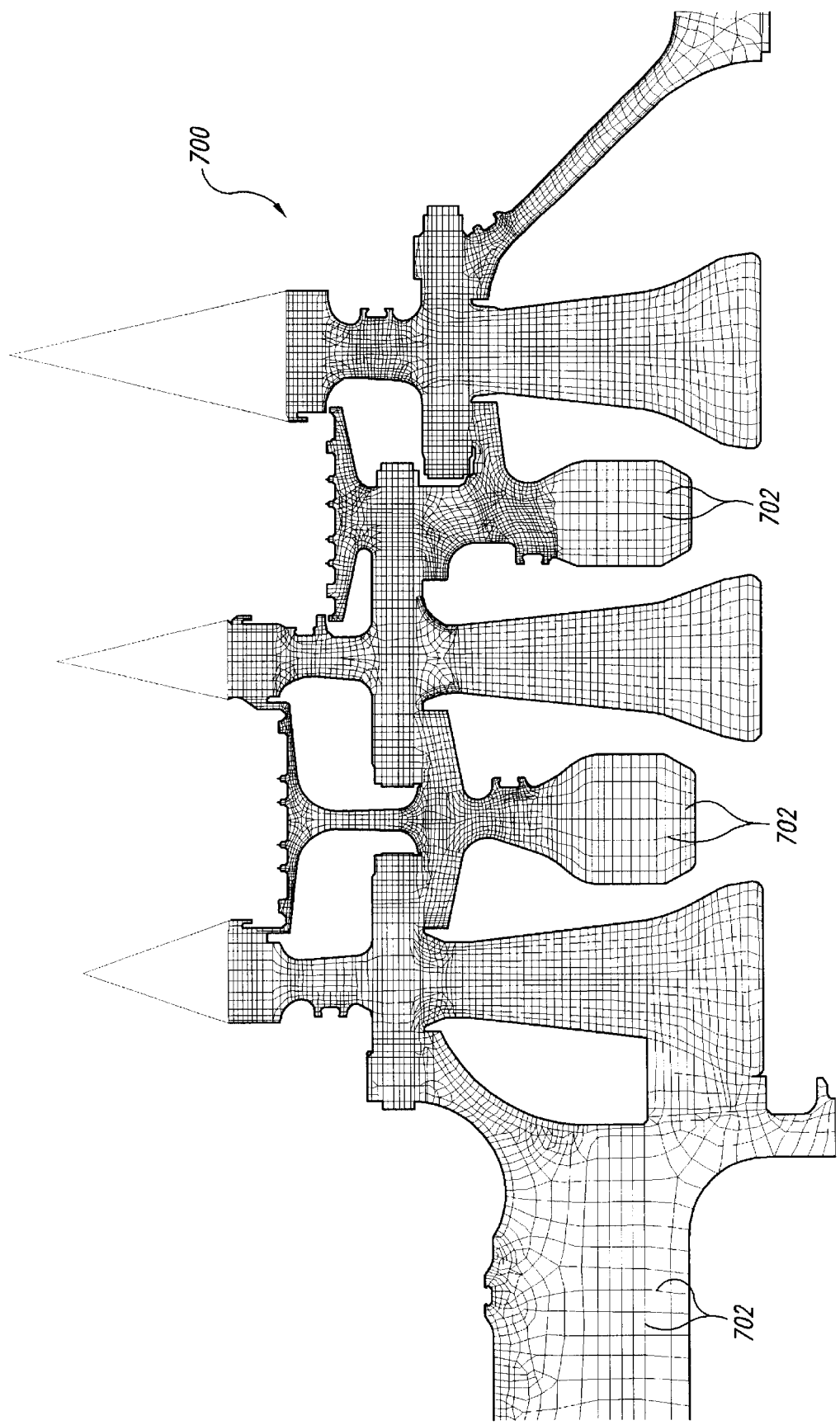
FIG. 7 is a cross-sectional side view of a mesh applied to the geometry shown in FIG. 6.
Figure 8:
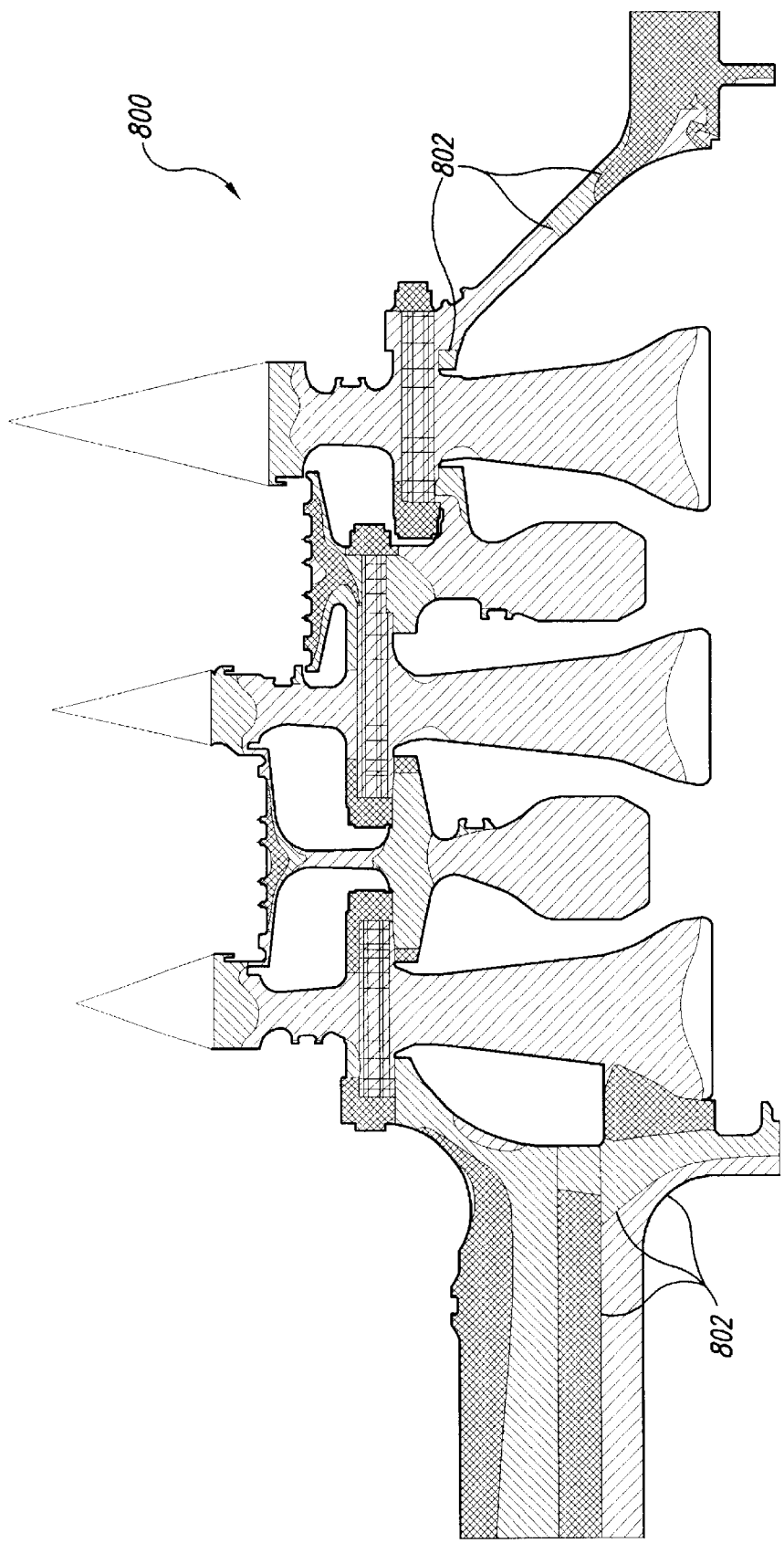
FIG. 8 is a cross-sectional side view of stress contours corresponding to a structural analysis of the geometry shown in FIG. 6.

FIG. 7 illustrates a mesh 700 of the geometry 600 having mesh lines 702 applied to the altered elements 612a–612c, as well as the other elements of the altered geometry 600. FIG. 8 illustrates contour plot 800 overlaid on the geometry 600 and having contour lines 802 to graphically indicate stress levels calculated by the solver 122 (FIG. 1). Accordingly, users can evaluate the predicted stress levels for the geometry using the contour plot 800 and, based on the predicted stress levels, determine whether additional geometry modification is required.

Figure 9:
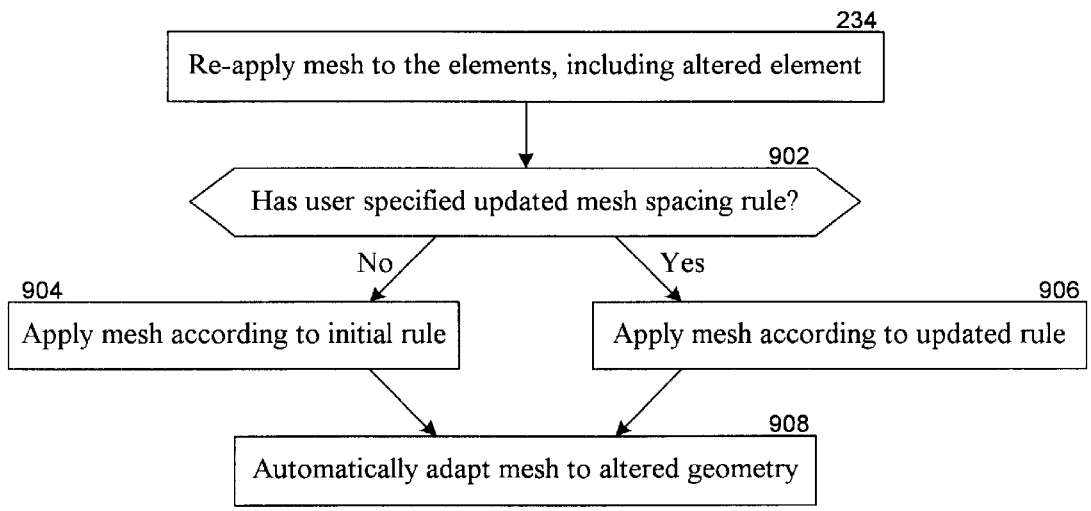
FIG. 9 is a flow diagram illustrating a method for applying a mesh to an altered geometry in accordance with an embodiment of the invention.

FIG. 9 is a flow diagram illustrating details of step 234 (re-applying mesh to the elements, including the altered element) in accordance with an embodiment of the invention. In step 902, it is determined whether or not the user has specified an updated mesh spacing rule. If the spacing rule has not been updated, the mesh is applied according to the same rule applied to the mesh of the baseline geometry (step 904). If the user specifies an updated mesh, then the mesh is applied to the altered geometry according to the updated rule (step 906). In either embodiment, the mesh is automatically adapted to the altered geometry in step 908, with the degree of automation determined by whether or nor the user manually inputs a new mesh spacing rule.

Figure 10:
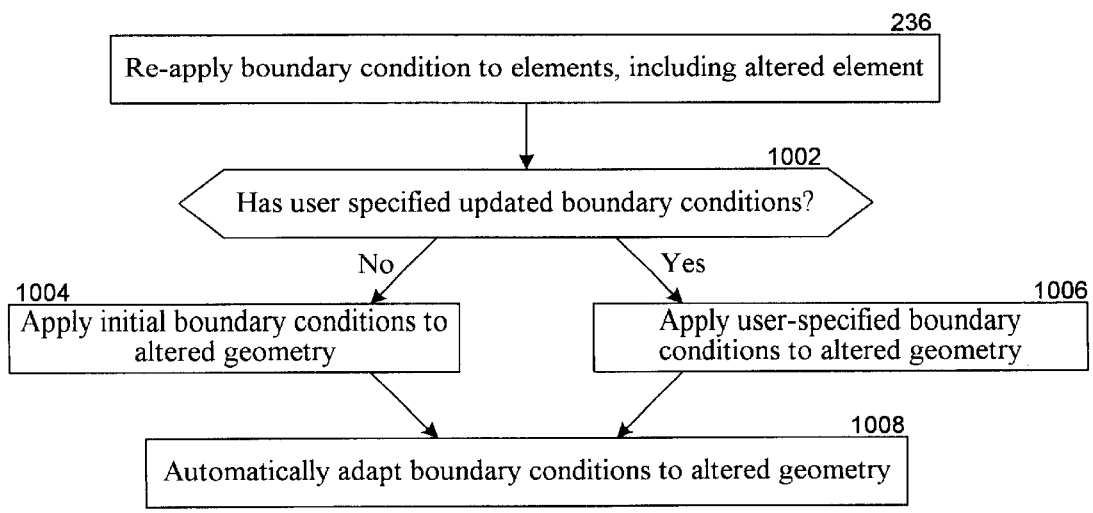
FIG. 10 is a flow diagram illustrating a method for applying boundary conditions to an altered geometry in accordance with an embodiment of the invention.

FIG. 10 is a flow diagram illustrating details of step 236 (re-applying boundary conditions to elements, including the altered element) in accordance with an embodiment of the invention. In one aspect of this embodiment, it is determined whether or not the user has updated the boundary conditions (step 1002). If the user has not specified updated boundary conditions, the boundary conditions initially applied to the baseline geometry are applied to the altered geometry. IF the user has specified updated boundary conditions, the updated boundary conditions are applied to the altered geometry (step 1006). In either embodiment, the boundary conditions are automatically adapted to the altered geometry in step 1008. For example, if the length of a particular element has changed from an initial value in the baseline geometry to a new value in the altered geometry, the force boundary condition applied to that element can be automatically updated to account for the fact that the length of the element has changed.

One feature of embodiments of a method described above with reference to FIGS. 1–10 is that an associativity can be established and maintained between the elements of the geometry, the first identifiers or element identifiers (applied to the geometry by the geometric generator or another routine) and the second identifier or analyzer identifier (used by the analyzer 116 to generate a numerical solution). One advantage of this arrangement is that the solution results can be more easily traced back to the baseline geometry by the correspondence between the identifiers. For example, users can more easily identify the exact element or element portion that should be altered to change the loads in a particular region of the geometry.

Another feature of embodiments of a method described above with reference to FIGS. 1–10 is that the same first identifier or element identifier can be applied to an altered geometric element as was initially applied to the baseline geometric element. Accordingly, the analyzer 116 can treat certain aspects of the altered geometric element in the same manner as the baseline geometric element. For example, the boundary condition applicator 118 can apply the same boundary conditions to the altered geometric element as were initially applied to the baseline geometric element. The mesh generator 120 can apply mesh to the altered geometric element in generally the same manner as the mesh was initially applied to the baseline geometric element. In a further aspect of this embodiment, the boundary conditions and/or the mesh can be automatically adjusted to account for the changed geometry. Accordingly, the effort required by the user to analyze the altered geometry can be reduced because the user need not manually regenerate the mesh and boundary conditions to fit the altered geometry.

Still another feature of embodiments of a method described above with reference to FIGS. 1–10 is that the geometry can be altered in a parametric, at least partially automatic fashion. For example, portions of the baseline geometric element can be altered by the user and the effect of the alteration can be automatically transmitted to the remainder of the element and/or to adjacent elements. Accordingly, the effort required on the part of the user to alter the geometry can be reduced when compared to conventional methods.

Yet another feature of embodiments of a method described above with reference to FIGS. 1–10 is that the boundary conditions and mesh can be applied to the geometry and the altered geometry in a batch fashion, for example, via the script 254. Accordingly, users need not manually and interactively apply boundary conditions and mesh specifications to elements of the baseline geometry or the altered geometry, as is the case for some conventional methods. An advantage of this feature is that the time and effort required to analyze the altered geometry can be reduced when compared to such conventional methods.

Still another feature of embodiments of a method described above with reference to FIGS. 1–10 is that the arrangement of the identifiers can be ordered. Accordingly, when it is desired to search for a particular element (e.g., during post-processing or pre-processing) to evaluate or alter characteristics of that element, the identifiers corresponding to the element can be readily determined by an ordered search.

In one embodiment described above with reference to FIGS. 1–10, the method can include generating a numerical representation of a turbine and conducting a numerical analysis of stress loads on the turbine. In other embodiments, the method can include generating different types of geometries and performing different types of numerical analyses. For example, the method can include generating a flow field analysis or a thermal analysis of a selected geometry. The selected geometry can include any type of component for which such analysis is desired.

Figure 11:
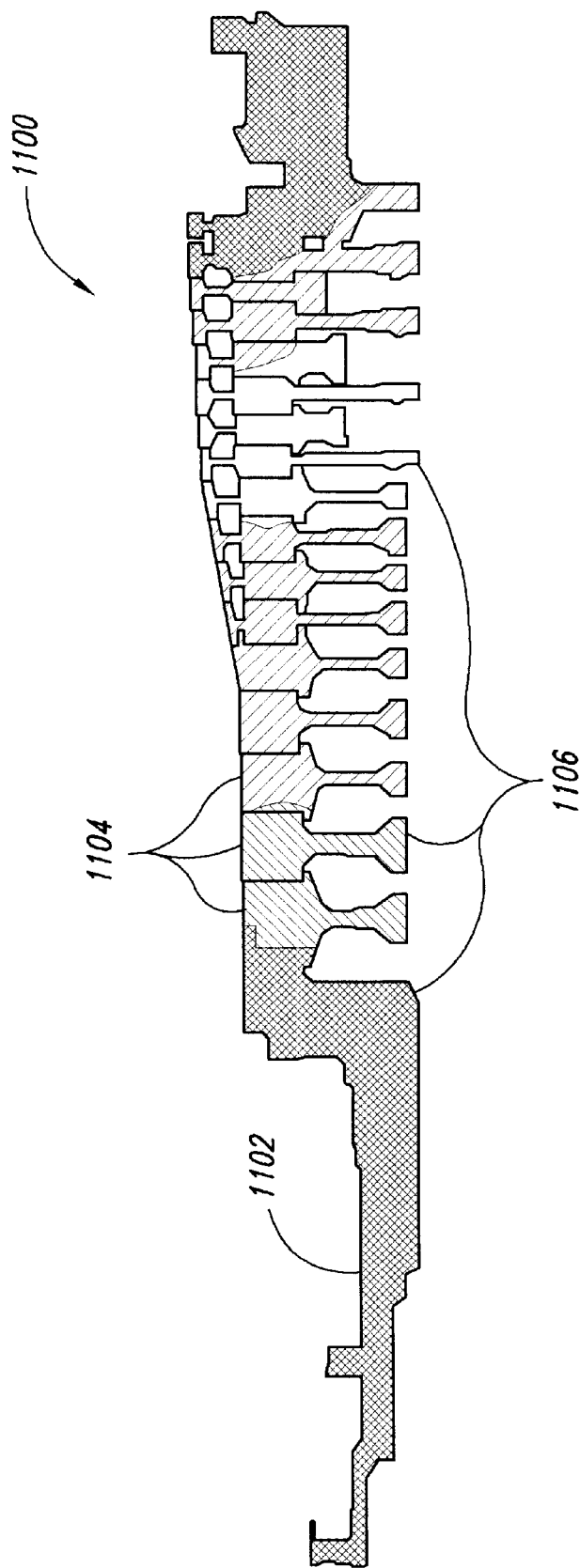
FIG. 11 is a cross-sectional side view of a compressor geometry having thermal contours superimposed thereon.
Figure 12:
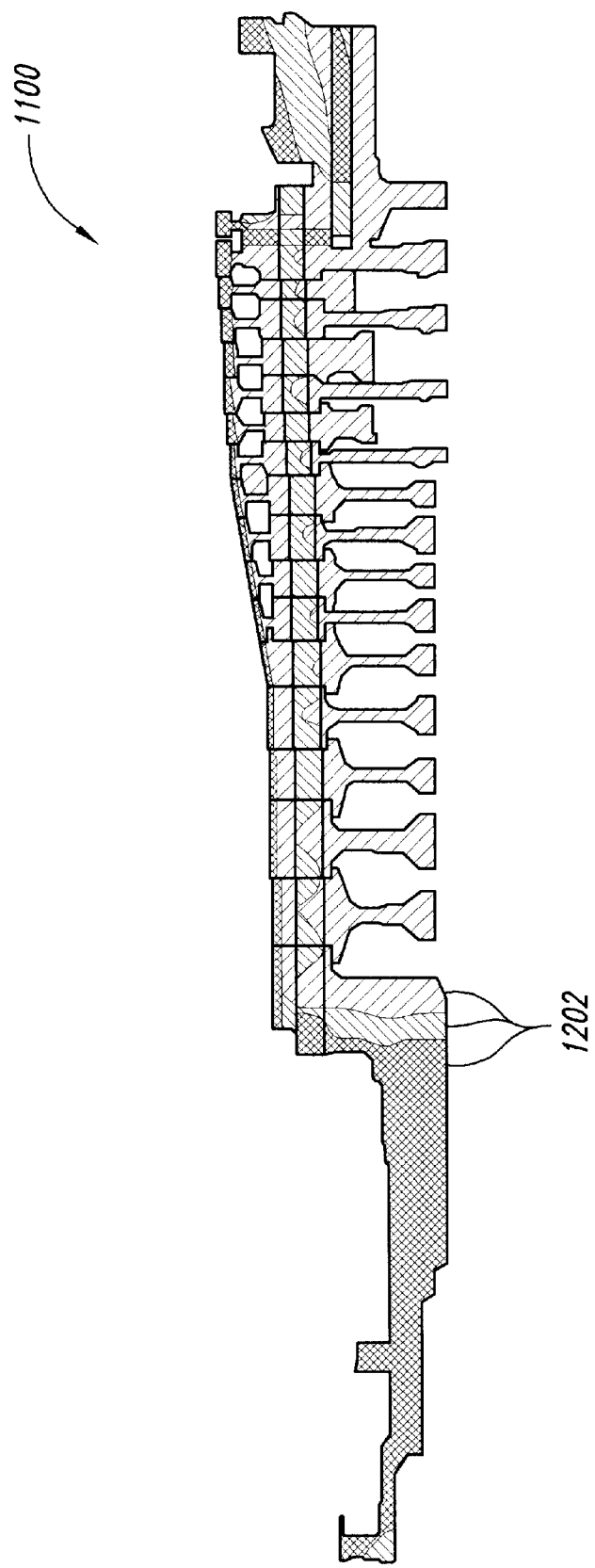
FIG. 12 is a cross-sectional side view of stress contours applied to the compressor geometry of FIG. 11.

In one embodiment, shown in FIG. 11, the geometry can include an axial flow compressor 1100 having a shaft 1102 and a series of compressor stages 1104. In a further aspect of this embodiment, the compressor 1100 can be coupled to a turbine of the type described above with reference to FIGS. 3–10. In general, the steps described above with reference to FIGS. 2A–2C can be performed to produce a thermal analysis of the compressor 1100. The results of the analysis can include temperature contours 1106 representing thermal gradients in the compressor components.

Because the analysis in one embodiment is a thermal analysis rather than a structural analysis, the specifics of several of the steps shown in FIGS. 2A–2C may differ from those described above. For example, the boundary conditions applied to the geometry can include thin film coefficients, conductive heat transfer coefficients and convective heat transfer coefficients, instead of pressures and forces. The equations solved by the solver 122 can include conductive, convective and/or radiative heat transfer equations rather than force and moment equations. The solver 112 used for the thermal analysis can include or be linked to a flow field solver, for example, to account for the thermal effect of primary and/or secondary gas flows through and within the geometry. The mesh generated by the mesh generator 120 can be specifically tailored to a thermal analysis (e.g., the mesh can be concentrated in areas of high thermal gradients). Conversely, the steps of assigning first and second identifiers to elements of the compressor geometry (steps 204 and 206), establishing and maintaining a correspondence between the geometric elements and the identifiers (step 208), replacing a geometric element with an altered geometric element (step 224) and reapplying the mesh and boundary conditions to the altered geometric element (steps 234 and 235) can be performed in a manner generally similar to that described above with reference to FIG. 2C.

In one aspect of the foregoing embodiment, the thermal analysis can be completed independently of a structural analysis and the geometry changes can be driven by thermal considerations. In another aspect of the method described above with reference to FIG. 11, the results of the thermal analysis can provide a boundary condition for input to the structural analysis. Accordingly, the thermal contours shown in FIG. 1100 can provide boundary conditions upon which the mechanical properties (such as the thermal expansion coefficient) of the geometric elements can be based. The thermal boundary conditions can also provide the basis for computing the thermal stresses and strains experienced by the elements as part of the process of solving the governing load equations (step 218). In still a further aspect of this embodiment, the same code can be sued to perform both the thermal and the structural analysis of the component. For example, an ANSYS code can be used for both solutions. Alternatively, different codes can be sued to perform each analysis. In either embodiment, the results of a stress analysis using the thermal analysis as input can be of the type shown in FIG. 12, which illustrates stress contours 1202 superimposed on the compressor geometry 1100.

In one embodiment, the thermal analysis and the structural analysis can be conducted in a manner that makes use of common features of the analysis techniques. For example, when the thermal analysis requires more elements than the structural analysis, the number, size and location of the elements can be controlled by the requirements of the thermal analysis. Accordingly, the same elements can be used for both the thermal and the structural analysis because the number of elements required to adequately resolve the thermal solution will be more than sufficient to adequately resolve the structural solution. In still another aspect of this embodiment, the first identifiers (or the element identifiers) can remain associated with the elements (and the altered elements) throughout both the thermal and structural analysis. Accordingly, the associativity between baseline and altered elements can couple aspects of the thermal analysis (such as the solution results) with aspects of the structural analysis.

From the foregoing, it will be appreciated that although specific embodiments of the invention have been described herein for purposes of illustration, various modifications may be made without deviating from the spirit and scope of the invention. Accordingly, the invention is not limited except as by the appended claims.

What is claimed is:

1. A method in a computer system for analyzing a geometry, comprising;

receiving a representation of the geometry, including a geometric element with an element identifier;

receiving a mapping between the element identifier and an analyzer identifier;

for each command to be applied to the geometric element, determining the analyzer identifier for the element from the mapping using the element identifier;

generating a command that identifier the element by the determined analyzer identifier; and analyzing thermal characteristics of the geometry with reference to the determined analyzer identifier.

2. The method of claim 1 wherein receiving a representation of the geometry is performed by an analyzer module and generating a command that identifiers the element is performed external to the analyzer module.

3. The method of claim 1, further comprising:

solving an equation governing the thermal characteristics of the geometry;

providing results of solving the equation as a boundary condition for a structural analysis of the geometry; and analyzing structural characteristics of the geometry.

4. The method of claim 1 wherein generating a command includes assigning at least one of a mesh and a boundary condition of the element.

5. The method of claim 1, wherein the analyzer identifier is a baseline analyzer identifier, further comprising:

receiving a representation of an altered version of the geometry having the element replaced by an altered element different than the element and identified by the same element identifier;

receiving a mapping between the element identifier and an altered analyzer identifier;

for each command to be applied to the altered geometric element, determine the altered analyzer identifier for the element from the mapping using the element identifier; and generating a command that identifies the altered element by the determined altered analyzer identifier.

6. The method of claim 1, further comprising receiving an input to change the element or portion of the element to form a representation of an altered element different than the element and identified by the same element identifier, and automatically adjusting adjacent elements and/or adjacent portions of the element to account for the change.

7. The method of claim 1 wherein the representation of the geometry is generated by a geometry generator, and further wherein receiving a representation of the geometry includes receiving a representation of the geometric element with the element identifier automatically assigned by the geometry generator.

8. A method in a computer system for analyzing a geometry, comprising;

receiving a numerical representation of the geometry, including a geometric element identified by a first identifier;

assigning a second identifier to the geometric element to link the second identifier with the numerical representation of the geometric element;

establishing a correlation between the first identifier, the second identifier and the geometric element;

analyzing thermal characteristics of the geometry with reference to the second identifier;

receiving an input to change the geometric element or portion of the geometric element to form a numerical representation of an altered geometric element different than the geometric element and identified by the same first identifier, and automatically adjusting adjacent geometric elements and/or adjacent portions of the geometric element to account for the change;

linking a third identifier to the numerical representation of the altered geometric element;

establishing a correlation between the first identifier, the third identifier and the altered geometric element; and analyzing thermal characteristics of the altered version of the geometry, including the altered geometric element, with reference to the third identifier.

9. The method of claim 8, further comprising selecting the geometry to include a representation of an axial flow compressor.

10. A method in a computer system for analyzing a geometry, comprising;

receiving a numerical definition of the geometry, the numerical definition including a plurality of geometric elements;

assigning thermal boundary conditions to at least one of the geometric elements;

analyzing thermal characteristics of the geometry with a computer-based numerical analysis tool;

receiving an input to change the at least one geometric element or portion of the geometric element to form a numerical representation of an altered geometric element different than the geometric element;

automatically re-assigning the thermal boundary conditions to the altered geometric element; and analyzing thermal characteristic of the geometry, including the altered geometric element, with the computer-based numerical analysis tool.

11. The method of claim 10, further comprising selecting the boundary conditions to include at least one of a film coefficient, a thermal conduction coefficient, a thermal convection coefficient and an initial temperature of the geometric element.

12. The method of claim 10, further comprising automatically adjusting the thermal boundary conditions to account for differences between the geometric element and the altered geometric element before re-assigning the thermal boundary conditions to the altered geometric element.

13. A method in a computer system for analyzing a geometry, comprising:

receiving a numerical definition of the geometry, the numerical definition including a plurality of geometric elements;

applying a mesh of first grid lines to the geometry, the grid lines being spaced apart from each other according to a first spacing rule;

analyzing thermal characteristic of the geometry with a computer-based analyzer;

receiving an input to change at least one geometric element or portion of the geometric element to form a numerical representation of an altered geometric element different than the geometric element;

automatically applying a mesh of second grid lines to the altered geometric element, the second grid lines being spaced apart from each other according to a second spacing rule generally the same as the first spacing rule; and analyzing thermal characteristics of the geometry, including the altered geometric element, with the computer-based analyzer.

14. The method of claim 13, further comprising:

solving an equation governing the thermal characteristics of the geometry;

providing results of solving the equation as a boundary condition for a structural analysis of the geometry; and analyzing structural characteristics of the geometry.

15. The method of claim 13 wherein the at least one geometric element is initially identified by a first identifier, further comprising:

assigning a second identifier different than the first identifier to the at least one geometric element;

establishing a correlation between the first and second identifiers; and assigning the same first identifier to the altered geometric element.

16. A method in a computer system for performing a thermal and structural analysis of a selected configuration, comprising:

generating a numerical representation of a first geometry using a computer-based geometry generator;

dividing the numerical representation into a plurality of elements;

defining and identifying first edges and first faces for each elements;

assigning first tags to each first edge and each first face;

transferring numerical definitions of the first edges and the first faces to a computer-based thermal analyzer;

assigning second tags to the first edges and the first faces in the thermal analyzer;

establishing a correlation between the first tags, the second tags and the elements;

applying thermal boundary conditions to the first edges and/or the first faces with reference to the second tags;

performing a computer-based thermal analysis of the first geometry using the thermal analyzer with reference to the second tags;

providing results of the thermal analysis of the first geometry as structural boundary conditions for a structural analysis of the first geometry;

assigning third tags to the first edges and the first faces in computer-based structural analyzer;

establishing a correlation between the first tags, the third tags and the elements;

performing a computer-based structural analysis of the first geometry using the structural analyzer with reference to the third tags;

receiving an input to change at least one element or portion of the at least one element to form a numerical representation of an altered element different than the at least one element and identifier by the same first identifier, and automatically adjusting adjacent elements and/or adjacent portions of the at least one element to account for the change, and form a second geometry having the altered element with second edges in place of the first edges and a second face in place of the first face;

assigning the same first tags to the second edges and face as were assigned to the corresponding first edges and face;

transferring numerical definitions of the second edges and the second face to the thermal analyzer;

automatically re-assigning the thermal boundary conditions to the second edges and/or the second face by referring to the first tags; and performing a thermal analysis of the second geometry using the thermal analyzer.

17. A computer-based system for analyzing a geometry, comprising:

a geometry generator capable of generating a numerical model of a geometry, the numerical model having a geometric element identified by an element identifier;

an analyzer capable of performing a numerical analysis of thermal characteristics of the geometry by applying thermal boundary conditions to the geometry and solving equations governing the thermal characteristics using analyzer identifiers different than the element identifiers, the analyzer being configured to automatically apply at least approximately the same thermal boundary conditions to an element of the geometry and to an altered version of the element that is different than the element; and an identifier tracker capable of tracking a correspondence between the element identifier, the analyzer identifier, the element, and the altered element.

18. The system of claim 17, further comprising a mesh generator configured to apply a first mesh of grid lines to the element and automatically apply a second mesh of grid lines to the altered version of the element with a spacing rule to grid lines of the first mesh being approximately the same as a spacing rule for grid lines of the second mesh.

19. A computer-readable medium storing and/or transmitting instructions which, when executed by a computer, perform a method for analyzing a geometry, the method comprising:

receiving a representation of the geometry, including a geometric element with an element identifier;

receiving a mapping between the element identifier and an analyzer identifier;

for each command to be applied to the geometric element, determining the analyzer identifier for the element from the mapping using the element identifier;

generating a command that identifier the element by the determined analyzer identifier; and analyzing thermal characteristics of the geometry with reference to the determined analyzer identifier.

* * * * *